Nov. 10, 1925.  1,560,776

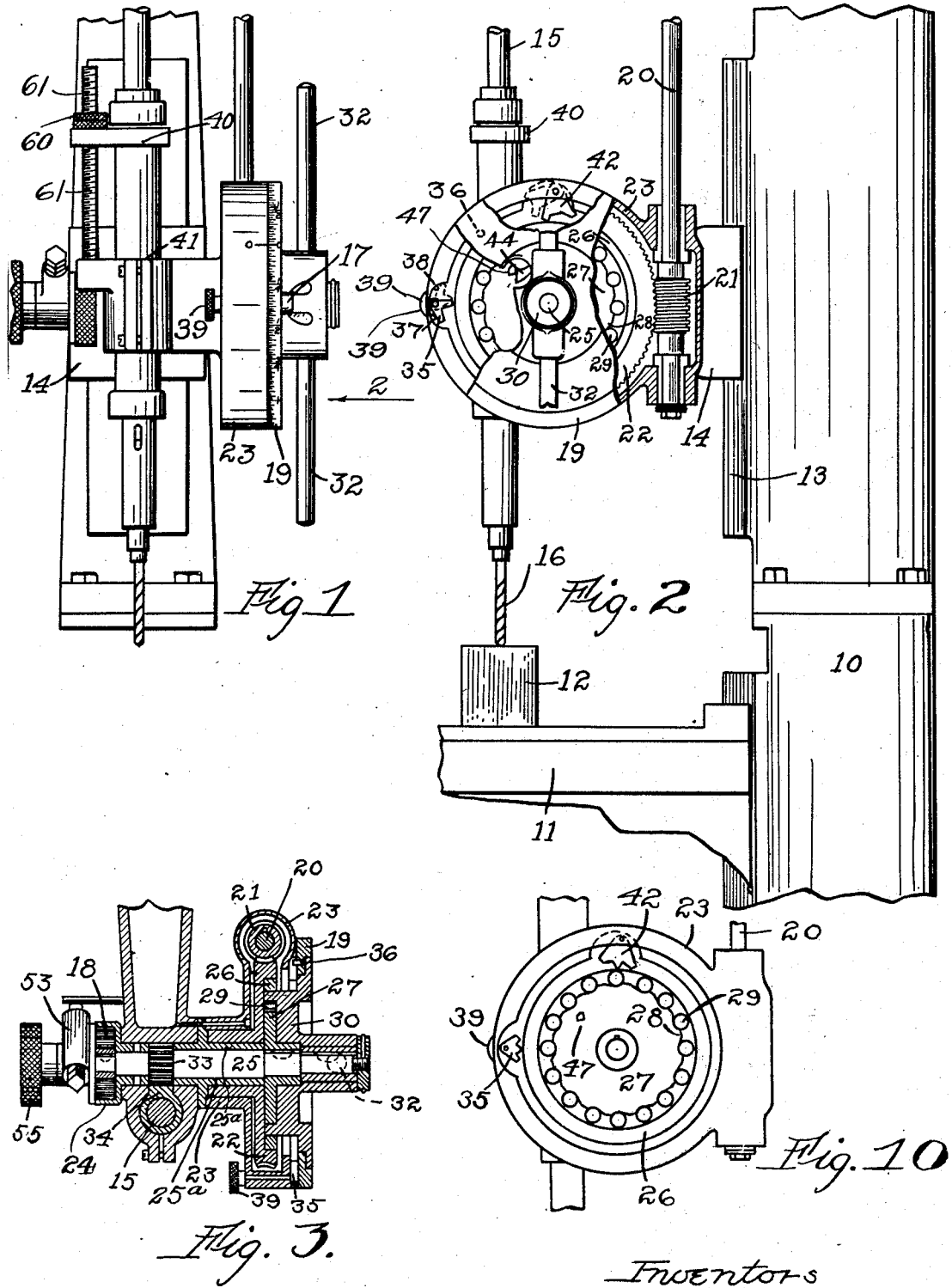

A. J. GIFFORD ET AL

CLUTCH FOR POWER FEED

Filed Oct. 30, 1922   3 Sheets-Sheet 2

Inventors
Albert J. Gifford
Benjamin S. T. Bishop
By Attorneys.

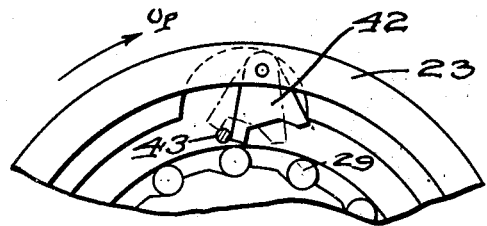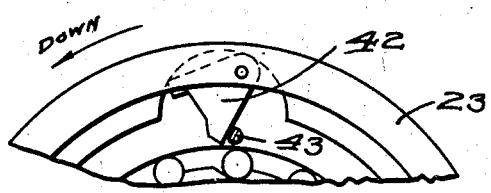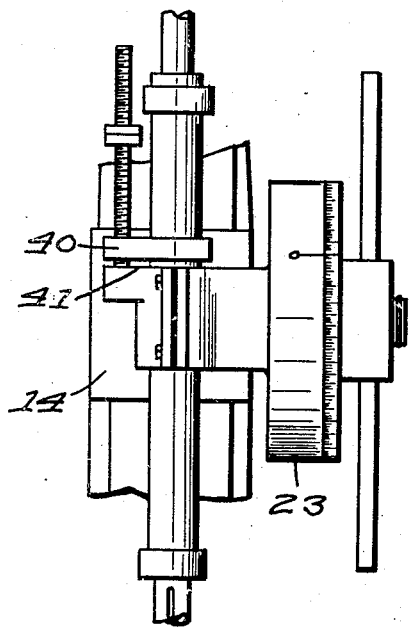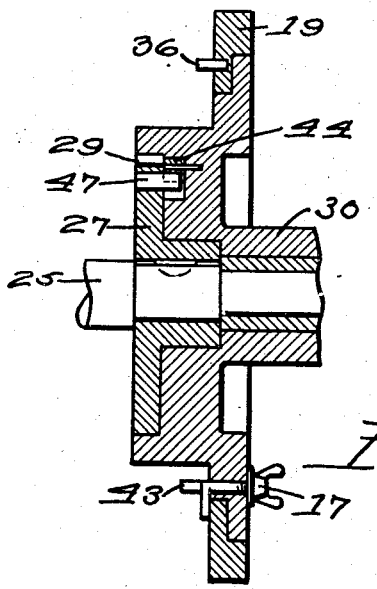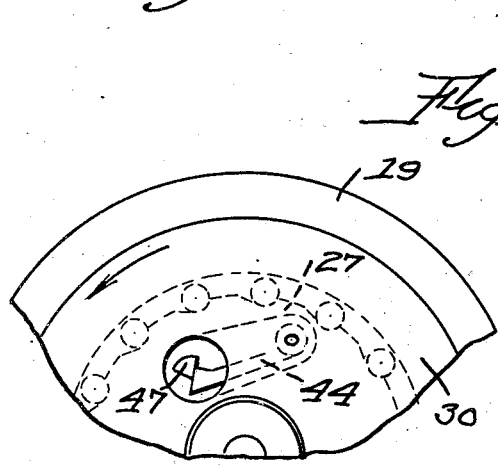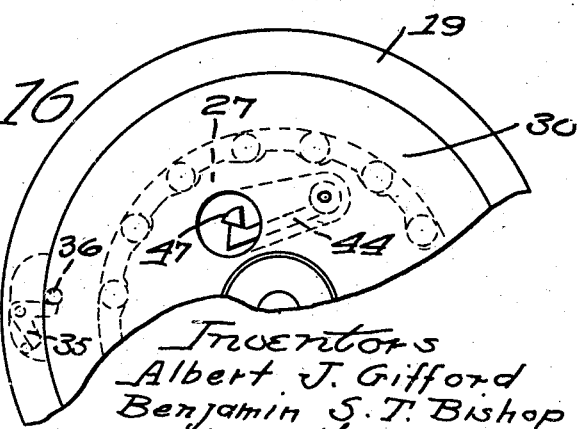

Patented Nov. 10, 1925.

1,560,776

UNITED STATES PATENT OFFICE.

ALBERT J. GIFFORD, OF SHREWSBURY, AND BENJAMIN S. T. BISHOP, OF WORCESTER, MASSACHUSETTS, ASSIGNORS TO LELAND-GIFFORD COMPANY, A CORPORATION OF MASSACHUSETTS.

CLUTCH FOR POWER FEED.

Application filed October 30, 1922. Serial No. 597,717.

*To all whom it may concern:*

Be it known that we, ALBERT J. GIFFORD and BENJAMIN S. T. BISHOP, citizens of the United States, respectively residing at Shrewsbury and Worcester, in the county of Worcester and State of Massachusetts, have invented a new and useful Clutch for Power Feed, of which the following is a specification.

This invention relates to improvements in the means for operating and controlling a clutch to be used on a power feeding device for drilling, reaming, tapping, boring or other operations.

The principal objects of the invention are to provide means associated with the clutch through which power is transmitted to the tool shaft by which, when the clutch is operated to connect the power feed with the tool shaft, automatic means will be actuated thereby to hold the clutch in by spring pressure as long as conditions remain the same and the tool is being fed into the work and until the depth gauge or limit stop acts to throw the clutch out and also acting to hold the clutch out thereafter and being arranged to be automatically set either in the driving or non-driving position; and furthermore to provide means whereby when the clutch is not to be thrown in automatically by the engagement of the tool with the work as is necessary with some kinds of materials and some kinds of operations, the device can be set so that at the time when the tool comes into a position to engage the work the clutch will be automatically actuated and to provide this in a form in which it can be adjusted to provide for insuring this action taking place at any point in the path through which the tool travels toward the work.

The invention also involves further improvements in the details of construction and combinations of parts associated with these features.

Further objects and advantages of the invention will appear hereinafter.

Reference is to be had to the accompanying drawings, in which—

Fig. 1 is a front elevation of a part of a drill with a preferred embodiment of this invention applied thereto;

Fig. 2 is a side view partly broken away to show the interior construction;

Fig. 3 is a horizontal sectional view through the center of the shaft which directly drives the feed rack.

Fig. 10 is a view similar to Fig. 2 of a modification.

Figs. 11 and 12 are enlarged views showing the positive limit stop in two positions when the tool spindle is at its highest point, as shown in Fig. 1, and at its lowest point, as shown in Fig. 13, respectively;

Fig. 13 is a view similar to Fig. 1 showing the spindle down;

Fig. 14 is a central sectional view with the parts in the position shown in Fig. 15;

Fig. 15 is a front view showing the position of the parts when the clutch is disengaged; and Fig. 16 is a similar view showing the clutch engaged and also illustrating the position of the depth gauge when the clutch is engaged but about to be thrown out.

Figure 4:
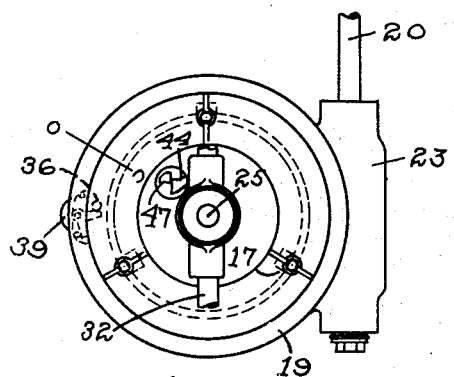
Fig. 4 is a face view of the clutch, similar to a portion of Fig. 2.
Figure 5:
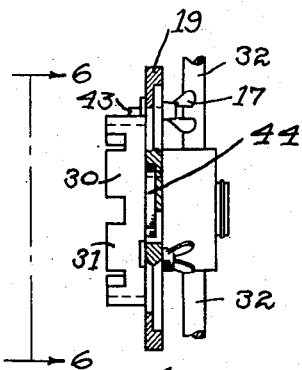
Fig. 5 is an edge view of the clutch ring with parts in section.

Although this invention is capable of general use, we have shown only one machine to which it can be applied, namely a sensitive drill. In order to show its connection with this machine and thus illustrate its use in general it may be stated that the drill frame 10 is provided with a work table 11 for the work 12 to be drilled or on which other operations are to be performed. On the upper part of the frame are vertical ways 13 on which travels a slide 14 carrying the tool spindle 15 in which may be mounted a drill 16 or other rotary tool for operating on the work 12. The slide 14 is also shown as provided with a drive shaft 20 driven in any desired way and having a worm 21 operating a worm wheel 22 constituting the driving element and located in a casing 23 which casing is a part of the slide and as far as rotation goes is stationary. Rotatably mounted on the edge of the casing 23 is a depth ring 19 having a circumferential scale and provided with thumb nuts and bolts 17 for securing it to the spider 30.

The worm wheel 22 is provided with a cylindrical hub which rotates on a stationary bushing $25^a$ which supports a horizontal shaft 25 constituting the element driven by the clutch. This worm wheel is cut out on its face to provide a flat circular space on one side in the outer edge of which is fixed a ring 26. The worm wheel 22 may be of hard bronze or other convenient material but the ring 26, which is fixed to it so as to constitute a solid part of it, is of steel to take the wear as will appear. The interior of this ring 26 preferably is cylindrical and constitutes the wearing thrust surface of the clutch. Fixed on the shaft 25 is a disc 27 having a plurality of slanting cam or wedge surfaces 28 spaced from each other. They are all rounded at the end to receive a plurality of clutch rolls 29. These clutch rolls are moved back and forth into and out of clutching position between the slanting surfaces on the disc 27 and the cylindrical surface of the wheel ring 26 by a loose spider 30. This spider has projections 31 extending between each two adjacent rolls and a slight turn in one direction will force the rolls up the inclines and cause the clutch to grip while a little turn in the other direction will release the clutch. As so far described, this is a clutch of the class known as the Horton clutch.

On the spider 30 is a handle, or preferably a pair of handles 32 for turning the spider. The shaft 25 near the other end has a spur gear 33 meshing with a rack 34 carrying within it the quill 9 and tool spindle 15 and feeding them directly. Beyond this gear 33 is a flat coiled spring 18 with one end fixed to the shaft 25 and the other to the stationary bushing 24. This spring resists the lowering of the tool. This is shown more simply in Fig. 9. It will be understood that the spindle 15 is rotated in an independent way not shown herein.

In order to feed the tool spindle 15 down, the handles 32 are rotated and the tool will then be fed forward toward the work or away from it as desired. In order to provide for automatically connecting the clutch with the shaft 25 so that after moving the latter by hand through the handles 32 until the tool touches the work, or meets resistance in any other way, the power will be automatically connected to it, the following mechanism is provided.

Pivoted on the casing 23 and fixed on a shaft having a knurled head 39 is a depth gauge 35. We have shown it as provided with two arms but for certain purposes, either one or three can be used. These arms extend into a space between the casing 23 and the ring 19. On the ring 19 there is a pin 36 which, during the rotation of this ring, will come into contact with either arm of the depth gauge 35 that is located in the way of it and as it comes around it will swing that arm back against a stop 37. If only one arm is used that arm is made wide enough so that the device will have to stop the first time the pin 36 engages the depth gauge but two arms are shown located originally in the dotted line position where the upper arm engages another stop 38. Now the first time the pin 36 comes around it engages the lower arm of the depth gauge and swings it over into the full line position in Fig. 2 but has no other effect except that the other arm of the depth gauge is left projecting out, as shown in full lines. Now, the device can be rotated a complete revolution beyond that and then the pin 36 will engage the depth gauge and the latter will act as a positive stop.

For the purpose of operating this in this way the ring 19 is provided with a circular scale, as shown in Fig. 1, calibrated in the equivalents of inches of vertical motion of the quill. The casing 23 on which it is mounted is provided with a zero point. When the machine is to be started, the zero on the scale is brought to the zero point and then the ring 19 is turned clockwise away from it until the desired point on the scale registers with the zero point. This moves the pin 36 back and the scale shows how many inches and fractions of an inch the shaft 15 will be moved downwardly by the power before the device is stopped automatically.

On the quill 9 is a stop 40, the upward motion of which is limited by a pair of nuts 60 adjustable on a stationary screw 61.

In order to avoid chance of accidentally feeding the stop 40 on the quill 9 down positively against the bearing 41 (see Fig. 13) which is stationary, thus injuring the machine, a positive limit stop 42 is provided. This works similarly to the depth gauge but is not adjustable. It is pivoted on the casing and it has one or more arms projecting inwardly like the depth gauge and the spider 30 is provided with a pin 43 for cooperating with that in the same way. When this limit stop operates the spring 18 is left free to act and automatically returns the spindle to its uppermost position. In Fig. 10 the depth gauge and limit stop are shown as having three arms instead of two. In that case the spider 30 will rotate two and a fraction rotations before it stops.

Figure 6:
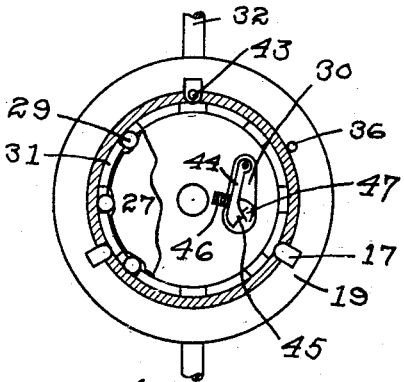
Fig. 6 is a sectional view of the clutch taken just beyond the edge of the clutch ring, as indicated by the ends of the arrows 6, 6 in Fig. 5.
Figure 7:
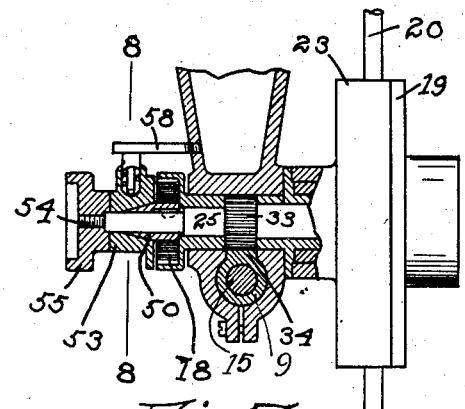
Fig. 7 is a horizontal central sectional view showing the clutch means in elevation.

After the clutch is connected so as to drive the shaft by power it is desirable that it should not be automatically disconnected in any accidental way and for this purpose we provide on the clutch spider 30 a lever 44 having a transverse edge 45 with a slanting surface on each side of it and pressed by a spring 46 into contact with a triangular pin 47 located on the disc 27. Now, when the tool 16 is moved down into contact with the work by rotating the handle 32 and shaft 25 the contact of the tool with the work provides a resistance against the further rotation of the shaft. The operator, however, continues to turn the handle and that causes a relative rotation between two parts that have been rotating together before, namely the shaft 25 and the clutch spider 30. The shaft 25, which has been rotating without lost motion with the clutch spider, now stops and the clutch spider continues to rotate a slight degree forcing the rolls up the inclines, as stated and thus connecting the clutch to transmit rotation by power from the worm wheel 22 and ring 26 to the disc 27 and shaft 25. This also causes a relative rotation between the triangular pin 47 and the lever 44 and forces the latter over the pin to the position shown in Fig. 6. Therefore, in order to disconnect the clutch again it is necessary to overcome the resistance due to the slanting contact surfaces of the parts 45 and 47 and the resistance of the spring 46. Now, when the hole is drilled to the desired depth and the pin 36 comes to a stop against the depth gauge 35 there will again be a relative rotation between the shaft 25 and the clutch spider 30 in the opposite direction and that will cause a relative motion of the parts 45 and 47 in the opposite direction and force the pin over the tip of the point 45, the spring 46 yielding to permit this action to take place. Just as this occurs the several projections 31 engage the respective rolls 29 from behind them and loosen the rolls from the position in which they are wedged between the wedge surfaces 28 and the ring 26. This releases the clutch and turns the clutch spider 30 further back, carrying the rolls 29 into the rounded or bottom surfaces of the wedges 28. At this time the lever 44 also moves over so as to carry its edge 45 clear over the pin 47 to its extreme position. This now holds the rolls safely out of active position. Then the clock spring 18 returns the spindle to its elevated position while the clutch is in that condition.

When drilling wood or aluminum or other soft material and when reaming, or performing some other operations which require comparatively little power, the contact of the tool with the work will not produce sufficient resistance to connect the clutch in the manner above described. In order to provide automatic means adapted to be set to connect the clutch when the tool moves to the point where it will start to act on the work, we have provided the following mechanism.

On the end of the shaft 25 beyond the spring 18 we provide a hollow cone 50 either keyed or otherwise connected with the shaft so as to rotate with it. The inner end of the spring 18 can be fixed to the cone. Fitting on the outside of this cone is an internal conical bushing 53. The shaft is provided with a screw thread 54 projecting beyond the bushing 53 and on this is a holding nut 55. The bushing 53 has an offset portion in which is a spring pressed pin 56 having an inclined pointed end 57. On the frame there is a fixed pin 58 on the path of this end.

Figure 8:
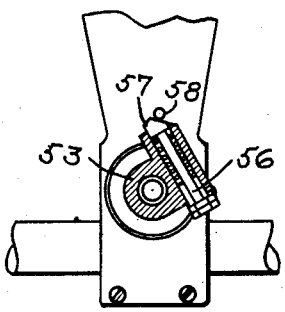
Fig. 8 is a sectional view of the same on the line 8—8 of Fig. 7.

This bushing 53 is loosened and turned to any desired position around the circumference so as to provide the necessary rotation before the tool spindle 15 is connected with the power. Then the nut 55 is tightened up and thereafter the bushing 53 will rotate with the shaft until the pointed end 57 comes in contact with the pin 58, as shown in Fig. 8. This then tends to stop the rotation of the shaft 25 and puts the necessary resistance on the same, as in the case described above, to connect the clutch automatically. Then the shaft 25 will be rotated by power and the tool driven into the work positively. On account of the pin 56 being spring-pressed, the end 57 will pass on beyond the pin 58 when the shaft operates by power and will engage it again at each rotation but without effect.

Figure 9:
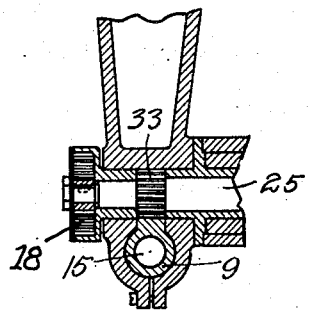
Fig. 9 is a view similar to Fig. 7 showing another form of that part of the invention.

In the form shown in Fig. 9 this feature is simply omitted.

It will be seen that the application of this invention to the form of clutch illustrated herein or to any other form of a similar type provides for the holding of the clutch locked in clutched position after it is moved thereto by either of the means described. When the clutch is unclutched it holds it in its unclutched position also. This depends upon spring-pressure and therefore is capable of being overcome by the use of enough force but will not be overcome by the ordinary fluctuations in power required for the operation being performed. The depth gauge acts in cooperation therewith to stop the machine and release the clutch at a predetermined time and at that time the holding device necessarily acts to hold the clutch open. Furthermore, the device can be set so that the tool will be connected automatically with the power at any desired point in its travel without depending upon the resistance of the work.

Although we have illustrated and described the invention as applied to a certain type of a machine tool and certain type of clutch, and shown only two forms of the invention, we are aware of the fact that it can be applied to other tools and other clutches of the same general type and that other modifications can be made by one skilled in the art without departing from the scope of the invention as expressed in the claims. Therefore, we do not wish to be limited in these respects but what we do claim is:—

1. In a roller clutch having a spider for operating the rollers to set and release the clutch, the combination with the spider, rollers, clutch members and driving and driven elements, of yielding means for turning the driven element backwardly, a pin having an angular edge, a lever having a similar edge for cooperating with the pin, one of the last named elements being mounted to move with the driven element and the other with the spider, and yielding means for holding said two angular edges in contact at one side of the apex thereof but permitting them to be forced by each other upon the application of sufficient force.

2. In a clutch, the combination with the driving and driven elements, a spring for moving the driven element backwardly, a series of rollers for connecting them, and a clutch spider for moving said rollers circumferentially in either direction to connect or disconnect said elements, of a spring pressed lever pivoted on the spider and having a pointed edge, a pin fixed with respect to the shaft having an oppositely pointed edge for holding the lever, and therefore the spider, in either its set or open position.

3. In a feed mechanism, the combination with the driving and driven elements, a spring for moving the driven element backwardly, a series of rollers for connecting them, and a clutch spider for moving said rollers circumferentially in either direction to connect or disconnect said elements, of a spring pressed lever pivoted on the spider and having a pointed edge, a pin fixed with respect to the shaft having an oppositely pointed edge for holding the lever, and therefore the spider, in either its set or open position, a casing in which the clutch is located, a depth ring having a circumferential scale thereon provided with a pin, and a depth gauge pivoted on the casing in position to be engaged by the pin to throw the clutch open.

4. In a feed mechanism, the combination with the driving and driven elements, a series of rollers for connecting them, and a clutch spider for moving said rollers in either direction to connect or disconnect said elements, of a spring pressed lever pivoted on the spider and having a triangular end, a triangular pin fixed with respect to the shaft for holding the lever, in either position, a casing in which said clutch is located, a depth gauge pivoted in the casing, and a depth ring adjustably carried by the spider having means for actuating the depth gauge at any desired depth to stop the feed.

5. In a feed mechanism, the combination with the driving and driven elements, a series of rollers for connecting them, and a clutch spider for moving said rollers in either direction to connect or disconnect said elements, of a spring pressed lever pivoted on the spider and having a triangular end, a triangular pin fixed with respect to the driven element for holding the lever in either position, a casing in which said clutch is located, a depth gauge pivoted in the casing, a depth ring adjustably carried by the spider having means for actuating the depth gauge at any desired depth, a limit stop in the casing, and means fixedly carried by the spider directly for operating the stop.

6. In a clutch, the combination with the driving and driven elements, a series of rollers for connecting them, a clutch spider for moving said rollers in either direction to connect or disconnect said elements, of a spring pressed lever pivoted on the spider and having a pin fixed with respect to the driven element for holding the lever, a cone fixed on the driven element, an internal conical bushing fitting the cone and rotatable thereon, means for fixing the bushing on the cone, a spring pressed pin on the bushing having a slanting end, and a fixed pin in the path of said slanting end for resisting the rotation of the driven element and setting the clutch.

7. In a clutch, the combination with the driving and driven element, a series of rollers for connecting them, and a clutch spider for moving said rollers in either direction to connect or disconnect said elements, of a spring pressed lever pivoted on the spider and having a pin fixed with respect to the shaft for holding the lever and circumferentially adjustable means connected with the driven element for applying a resistance to its rotation after it has operated a predetermined time and releasing the clutch.

8. The combination with a driving and a driven element, a series of rollers for connecting them, and a clutch spider for moving said rollers in either direction to connect or disconnect said elements, of circumferentially adjustable means connected with the driven element for applying a resistance to its rotation after it has operated a predetermined time and releasing the clutch.

9. The combination with a driving and a driven element, a series of rollers for connecting them, a clutch spider for moving said rollers in either direction to connect or disconnect said element, of a cone fixed on the driven element, an internal conical bushing fitting the cone and rotatable thereon, means for fixing the bushing on the cone, a spring pressed pin on the bushing having a slanting end, and a fixed pin in the path of said slanting end for resisting the rotation of the driven element and setting the clutch.

In testimony whereof we have hereunto affixed our signatures.

ALBERT J. GIFFORD.
BENJAMIN S. T. BISHOP.